United States Patent [19]
Novakovich et al.

[11] Patent Number: 5,404,465
[45] Date of Patent: Apr. 4, 1995

[54] METHOD AND APPARATUS FOR MONITORING AND SWITCHING OVER TO A BACK-UP BUS IN A REDUNDANT TRAINLINE MONITOR SYSTEM

[75] Inventors: Michael R. Novakovich; Joseph S. Majewski, both of Pittsburgh, Pa.

[73] Assignee: AEG Transportation Systems, Inc., Pittsburgh, Pa.

[21] Appl. No.: 29,348

[22] Filed: Mar. 10, 1993

Related U.S. Application Data

[63] Continuation of Ser. No. 853,250, Mar. 18, 1992, abandoned.

[51] Int. Cl.$^6$ .................... G06F 13/00; G06F 11/00
[52] U.S. Cl. ........................... 395/325; 371/8.1; 371/20.1; 371/68.1; 364/DIG. 1; 364/230.4; 364/240; 364/240.2; 364/240.7
[58] Field of Search .............. 395/325, 575; 371/8.1, 371/20.1, 29.5, 68.1

[56] References Cited

U.S. PATENT DOCUMENTS

| | | | |
|---|---|---|---|
| 4,245,344 | 1/1981 | Richtey | 371/68 |
| 4,527,271 | 7/1985 | Haller | 371/29.5 |
| 4,912,633 | 5/1990 | Schweizer et al. | 395/800 |
| 4,967,344 | 10/1990 | Scavezze | 395/575 |
| 5,086,499 | 2/1992 | Mutone | 371/8.1 |
| 5,210,756 | 5/1993 | Kummer et al. | 371/8.1 |
| 5,247,522 | 9/1993 | Reiff | 371/68.1 |

OTHER PUBLICATIONS

ISO 4335, Third Edition, "Information Processing Systems Data Communication—High-Level Data Link Control Elements of Procedures," International Organization for Standarization, Jan. 8, 1987.

Draft DIN 43322 German Standard specification, Parts 1, 2, 4 and 5 dated Jun. 1988 and Part 3 dated Jul. 1988, Parts 1–5 in English and Part 3 in German also.

*Primary Examiner*—Jack B. Harvey
*Assistant Examiner*—Ayaz R. Sheikh
*Attorney, Agent, or Firm*—Spencer, Frank & Schneider

[57] ABSTRACT

A method A and apparatus for monitoring and switching over from a primary bus to a back-up bus in a network having a master node and at least one slave node, the primary bus and the back-up bus each interconnecting the master node and the at least one slave node. The method includes periodically sending via the back-up bus from the master node to each of the slave nodes a master test packet containing a master address of the master node on the back-up bus and sending on the back-up bus from the at least one slave node to the master node and in response to receiving the master test packet, a slave test packet containing a slave address of the at least one slave node on the back-up bus. The method further includes indicating failures on the primary and back-up bus and disconnecting the primary bus from the master node and the at least one slave node and resuming communications between the master node and the at least one slave node via the back-up bus when a failure occurs on the primary bus and no failures occur on the back-up bus.

4 Claims, 3 Drawing Sheets

METHOD AND APPARATUS FOR MONITORING AND SWITCHING OVER TO A BACK-UP BUS IN A REDUNDANT TRAINLINE MONITOR SYSTEM

CROSS REFERENCE TO RELATED APPLICATIONS

This application is a continuation of application Ser. No. 07/853,250, filed Mar. 18, 1992, now abandoned.

This application is related to the following applications assigned to the same assignee as the present application which are hereby incorporate by reference:

U.S. patent application Ser. No. 07/686,927, entitled "PROPULSION CONTROL SYSTEM CENTRAL PROCESSING UNIT BOARD" filed Apr. 18, 1991, by William F. Molyneaux;

U.S. patent application Ser. No. 07/853,420, by Joseph S. Majewski, entitled "COLLISION HANDLING SYSTEM" filed Mar. 18, 1992;

U.S. patent application Ser. No. 07/853,796, now U.S. Pat. No. 5,353,413, by Michael R. Novakovich and Joseph S. Majewski, entitled "A METHOD AND APPARATUS FOR CHRISTENING A TRAINLINE MONITOR SYSTEM" filed Mar. 18, 1992;

U.S. patent application Ser. No. 07/853,540, now U.S. Pat. No. 5,293,632, by Michael R. Novakovich and Richard D. Roberts, entitled "A METHOD AND APPARATUS FOR LOAD SHEDDING USING A TRAINLINE MONITOR SYSTEM" filed Mar. 18, 1992;

U.S. patent application Ser. No. 07/853,960, now U.S. Pat. No. 5,289,176, by Michael R. Novakovich and Joseph S. Majewski, entitled "MULTI-MASTER RESOLUTION OF A SERIAL BUS" filed Mar. 18, 1992;

U.S. patent application Ser. No. 07/853,251, now U.S. Pat. No. 5,317,751, by Michael R. Novakovich and Richard D. Roberts, entitled "A METHOD AND APPARATUS FOR PLACING A TRAINLINE MONITOR SYSTEM IN A LAYUP MODE" filed Mar. 18, 1992;

U.S. patent application Ser. No. 07/853,186, by Henry J. Wesling, Michael R. Novakovich and Richard D. Roberts, entitled "REAL-TIME REMOTE SIGNAL MONITORING" filed Mar. 18, 1992;

U.S. patent application Ser. No. 07/853,402, by William F. Molyneaux, entitled "COMMUNICATIONS CONTROLLER CENTRAL PROCESSING UNIT BOARD" filed Mar. 18, 1992;

U.S. patent application Ser. No. 07/853,704, now U.S. Pat. No. 5,265,832, by Henry J. Wesling, Michael R. Novakovich and Richard D. Roberts, entitled "DISTRIBUTED PTU INTERFACE" filed Mar. 18, 1992.

BACKGROUND OF THE INVENTION

1. Field of the Invention

This invention relates generally to a method of providing a hot standby redundancy for a trainline communication network having a primary train bus and a back-up train bus interconnecting a master node and at least one slave node in the network, and in particular to a method and apparatus for monitoring and switching over to a back-up train bus in a redundant trainline monitor system.

2. Description of the Related Art

A train communication system is being developed by the assignee of the present application which, based on the proposed European specification DIN 43322 for "Serial Interfaces to Programmable Electronic Equipment for Rail Vehicles," incorporated herein by reference, enables a master node located typically in a head car of a train to communicate via a serial bus to slave nodes on middle cars of the train and on a tail car of the train. See also, "International Standard-Information processing systems-Data communication-High-level data link control elements of procedures, ISO 4335" Third edition, Global Engineering Documents, Irvine, Calif., 1987, the subject matter of which is also incorporated herein by reference.

SUMMARY OF THE INVENTION

An object of the invention is to provide a method of monitoring a back-up train bus in a redundant trainline monitor system and switching over from a primary train bus to a back-up train bus upon occurrence of a failure on the primary train bus, provided the back-up bus is functional.

These and other objects, advantages and features are accomplished in accordance with the provision of a method for monitoring and switching over from a primary bus to a back-up bus in a communications network having a master node and at least one slave node, the primary bus and the back-up bus each interconnecting the master node and the at least one slave node, including the steps of: indicating during normal operation of the network over the primary bus occurrence of a failure on the back-up bus; periodically sending on the back-up bus from the master node to each of the slave nodes a master test packet containing the address of the master node on the back-up bus; sending on the back-up bus from the at least one slave node to the master node and in response to receiving the master test packet a slave test packet containing a slave address of the at least one slave node on the back-up bus; indicating occurrence of a failure on the back-up bus between the master node and the at least one slave node if no slave test packet was received by the master node via the back-up bus or the slave test packet received via the back-up bus contains an incorrect slave address of the at least one slave node on the back-up bus else indicating occurrence of no failures on the back-up bus; and disconnecting the primary bus from the master node and the at least one slave node and resuming communications between the master node and the at least one slave node via the back-up bus when said indicating steps determine occurrence of a failure on the primary bus and no failures on the back-up bus indicated by the second means.

The above objects are further accomplished in accordance with the provision for an apparatus for monitoring and switching over from a primary bus to a back-up bus in a network having a master node and at least one slave node, the primary bus and the back-up bus each interconnecting the master node and the at least one slave node, including the steps of: first failure indicating means for indicating during normal operations occurrence of a failure on the primary bus; periodic sending means for periodically sending on the back-up bus from the master node to each of the slave nodes a master test packet containing a master address of the master node on the back-up bus; sending means for sending on the back-up bus from the at least one slave node to the master node and in response to receiving the master test packet, a slave test packet containing a slave address of the at least one slave node on the back-up bus; second failure indicating means for indicating occurrence of a failure on the back-up bus between the master node and the at least one slave node if no slave test packet was received by the master node via the back-up bus or the slave test packet received via the back-up bus contains an incorrect slave address of the at least one slave node on the back-up bus else indicating occurrence of no failures on the back-up bus; and disconnecting and resuming means for disconnecting the primary bus from the master node and the at least one slave node and resuming communications between the master node and the at least one slave node via the back-up bus when first and second failure indicating means indicate occurrence of a failure on the primary bus and no failures on the back-up bus.

The above and other objects, effects, features and advantages of the present invention will become more apparent from the following description of the embodiments thereof taken in conjunction with the accompanying drawings.

DETAILED DESCRIPTION OF THE PREFERRED EMBODIMENTS

Figure 1:
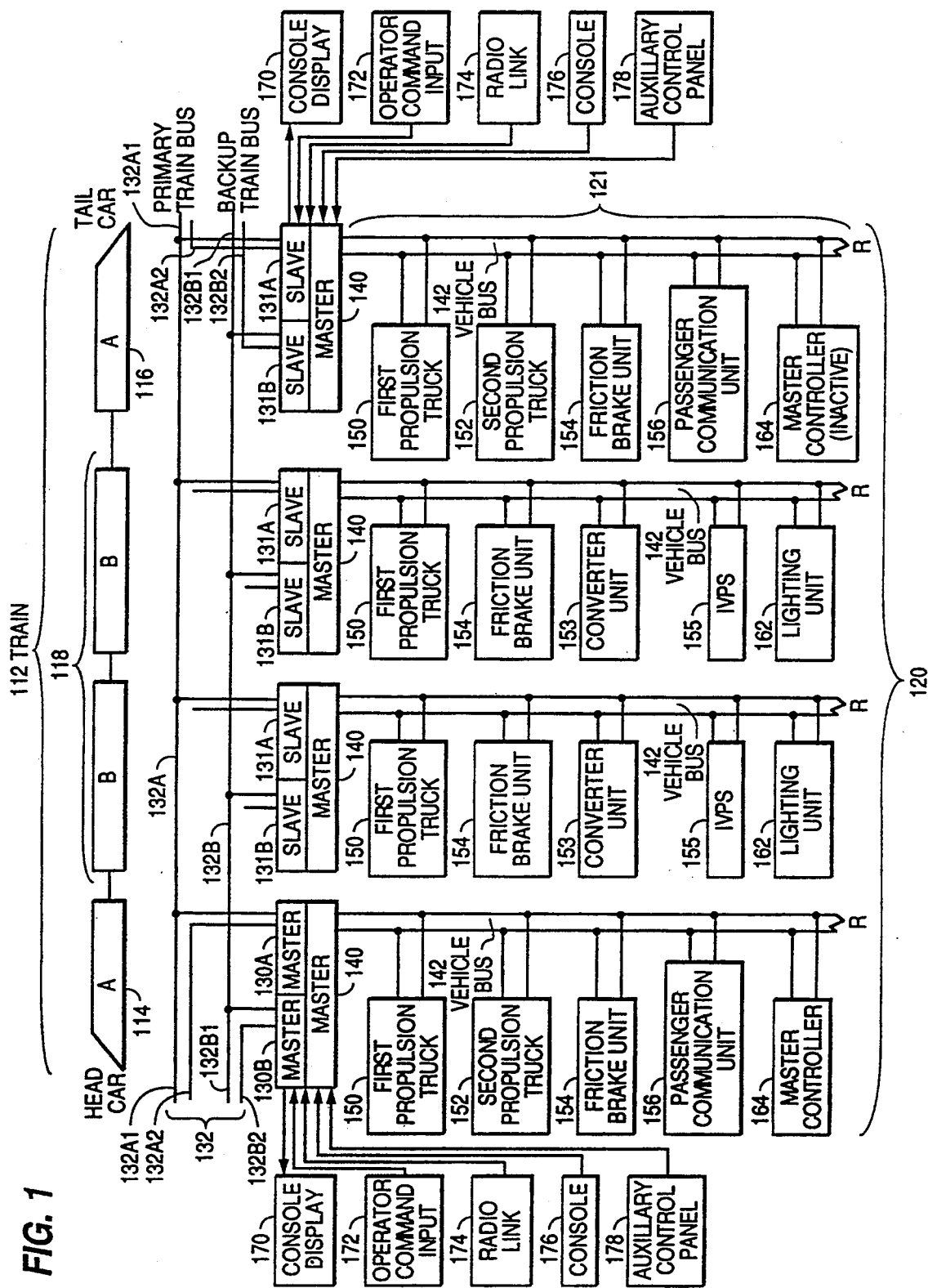
FIG. 1 is a schematic view of train and its associated trainline monitor (TLM) system in which the invention finds particular use.

Referring now to FIG. 1, there is shown a Trainline Monitor (TLM) System 120 in which the invention finds particular use. FIG. 1 shows a representative train 112 with a head car 114, a tail car 116, and middle cars 118. Only two middle cars 118 are shown, however, a typical commuter train may have from one to ten middle cars 118 having essentially the same equipment on board.

Head car 114 has redundant train bus masters including primary train bus master 130A and backup train bus master 130B as shown. Primary train bus master 130A serves as a master node for primary train bus 132A and backup train bus master 130B serves as a master node for backup train bus 132B. Primary train bus 132A and backup train bus 132B make up redundant train buses 132. In addition, middle cars 118 and tail car 116 each have redundant train bus slaves including primary train bus slave 131A and backup train bus slave 131B.

Primary train bus 132A has a main channel 132A1 and an auxiliary channel 132A2. Similarly, back-up train bus 132B has a main channel 132B1 and an auxiliary channel 132B2. Unless otherwise indicated, communications on primary train bus 132A take place on main channel 132A1 and communications on back-up train bus 132B take place on main channel 132B1. Communications on auxiliary channels 132A2 and 132B2 only occur when primary train bus slave 132A and back-up train bus slave 132B "conclude" that they are on a tail car 116 as discussed, for example, in commonly owned and concurrently filed U.S. patent application Ser. No. 07/853,796, entitled "A Method and Apparatus For Christening a Trainline Monitor System."

Each car 114, 116 and 118 has a vehicle bus master 140 with a vehicle bus 142. As used herein, trainline monitor system (TLM) 120 is intended to comprehend redundant train bus masters 130, redundant train bus slaves 131, redundant train buses 132, vehicle masters 140, vehicle buses 142 and intelligent subsystem interfaces (not separately shown) to vehicle buses 142 discussed below.

Middle cars 118 can have the same subsystems as head car 114 but they typically would not have a second propulsion truck 152 or master controller 164 but instead would have a convertor unit 153 and an intermediate voltage power supply (IVPS) 155. Tail car 116 has the same subsystems as head car 114 but with an inactive master controller 164. The following discussion regarding train bus master 130A applies to train bus master 130B as well.

Head car 114 has, in addition to redundant train bus masters 130A and 130B, a console display 170, operator command input unit 172, radio link unit 174, console 176 and auxiliary control panel 178, which facilitate control and communications by a train operator.

Vehicle bus master 140 with redundant train bus masters 130A, 130B or redundant train bus slaves 131A, 131B can be embodied in three separate CPUs or a single CPU with a multi-tasking operating system and three separate I/O ports. Each of the train buses 132A and 132B, with its master and slave devices, are preferably configured as an HDLC packet communications network.

Referring to head car 114, vehicle bus master 140 communicates with one of redundant train bus masters 130A and 130B which in turn communicate with the rest of TLM system 120 via one of the primary train bus 132A and backup train bus 132B, respectively. Vehicle bus 142 has predetermined nodes and therefore does not have to deal with such considerations as geographic addressing or car orientation. Vehicle bus 142 can be, for example, an Intel BITBUS in which case the subsystems would have BITBUS interfaces.

Vehicle bus master 140 and the various subsystems 150–156, etc., operate under standard master-slave communications protocols, such as Synchronous Data Link Control (SDLC), using a multidrop RS-485 serial link. Vehicle bus master 140, vehicle bus 142 and the various vehicle subsystems comprise a master-slave communication subsystem 121. Communications on TLM system 120 provide information to an operator of the vehicle about particular subsystems on the various vehicles of train 112.

The TLM system 120 is connected to first and second propulsion trucks 150 and 152 by vehicle bus 142. The TLM system 120 can transmit test commands, propulsion commands, real-time clock synchronization information, etc., to first and second propulsion trucks 150 and 152. First and second propulsion trucks 150 and 152 respond by transmitting back test results and status information over TLM system 120.

In a like manner, TLM system 120 is connected to convertor unit 153 by vehicle bus 142. TLM system 120 can transmit test commands and convertor control commands such as convertor on/off, load shedding commands and real-time clock synchronization information, etc., to convertor unit 153. Convertor unit 153 responds by transmitting back test results and status information to TLM system 120.

TLM system 120 is connected to a friction brake unit 154 by vehicle bus 142. TLM system 120 transmits test commands, braking commands and real-time clock synchronization information, etc., to friction brake unit 154. Friction brake unit 154 responds by transmitting back test results and status information to TLM system 120.

TLM system 120 is also connected to an intermediate voltage power supply (IVPS) 155 and passenger communication unit 156 by vehicle bus 142. IVPS converts 600 volt power into 300 volts which is necessary since some of the subsystems, such as friction brake unit 154, use 300 volt power. TLM system 120 transmits test commands, IVPS control commands, such as IVPS on/off commands, and real-time clock synchronization information, etc., to IVPS 155 and IVPS 155 responds by transmitting back test results and status information to TLM system 120.

TLM system 120 transmits test commands, real-time clock synchronization information, car serial number, relative car position, car orientation information, zero speed commands, door open and close commands, and odometer or speed signals, etc., to passenger communication unit 156. Passenger communication unit 156 responds by transmitting back test results and status information to TLM system 120.

TLM system 120 is also connected to other subsystems, such as a door control unit (not shown), a heating, ventilation and air conditioning (HVAC) unit (not shown), and a lighting unit 162, by vehicle bus 142. TLM system 120 transmits test commands, status requests, real-time clock synchronization information, car orientation information, etc., to these various units. The units respond by transmitting back test results and status information.

Operator command input unit 172 of head car 114 may be a waterproof piezo keyboard having piezo keys integrated into a 5 mm aluminum plate and operated through a 0.8 mm aluminum cover plate. Console display 170 may be an electro-luminescent self-illuminated screen. Console 176 is a state driven device having a "power-up" state and a "operating" state.

If a car in train 112 is keyed-up, then operator console 176 is enabled and this car becomes the head car with redundant train bus masters 130A, 130B. At start-up, console display 170 displays results of power-up self-test. Then, TLM system 120 enters an "operating state." Console display 170 then displays a simple status message (OK, Warning, Failed or Non-existent) for each subsystem 150–164 on each car of train 112. The operator can use operator command input 172 to access diagnostic information on any of the subsystems 121 on any of the cars of train 112.

Information can also be transmitted or received by a wayside station using radio link 174 thereby reporting diagnostic alarms and acting as a diagnostic data dump at a specific point along the wayside.

In TLM 120 system shown in FIG. 1 in which the invention has particular usefulness, redundant train buses 132 are based on the DIN 43322 specification developed especially for the railroad environment, the subject matter of which is hereby incorporated by reference. It is configured as a master-slave communication system that uses a multi-drop RS-485 serial link. The serial data is Manchester encoded for higher reliability. This also allows it to pass through the galvanic isolation between cars. Train bus messages between vehicles are encoded into standard high level data link control (HDLC) data packets which are described in "International Standard, ISO 4335," reference cited above. During operation, the HDLC-encoded messages and protocol ensure data integrity and provide a way to request data retransmission if necessary.

Under normal operations, primary train bus master 130A periodically sends monitor commands or messages in the form of HDLC packets to primary train bus slaves 131A via primary train bus 132A which either modify operating conditions and/or receive diagnostic information from intelligent subsystems 150–164. Under normal communications, primary train bus master 130A expects to receive an HDLC response packet within a predetermined time period (anywhere from milliseconds to several seconds). Such normal HDLC response packets include "I," "S," and "UF" responses as defined in ISO 4335. Hence, primary train bus master 130A determines the occurrence of a failure such as a lost primary train bus slave on primary train bus 132A if either the HDLC response packet contains incorrect data, or the HDLC response packet is not received within the predetermined time period.

Figure 2:
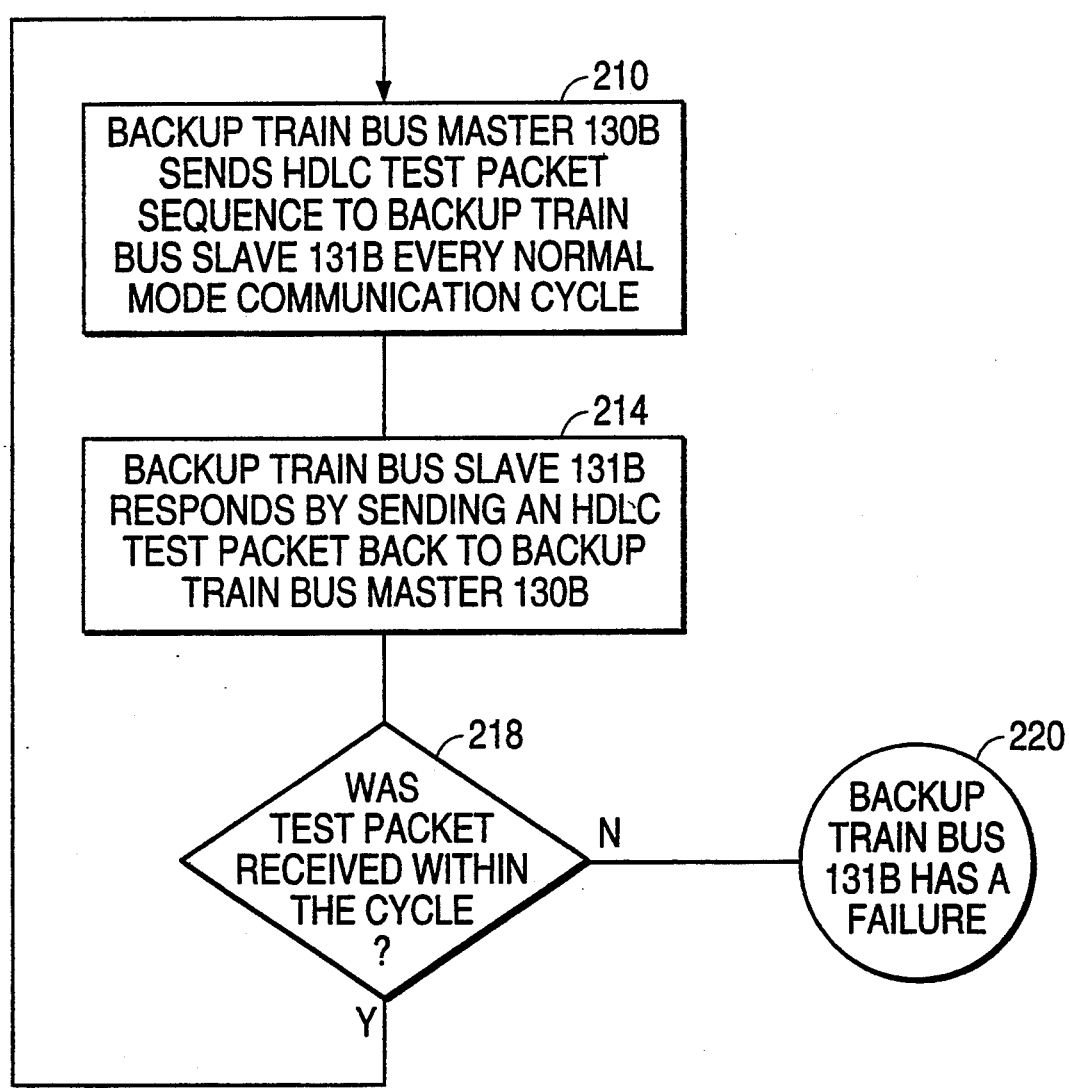
FIG. 2 is a flow chart showing the steps involved in monitoring the back-up train bus of the TLM system.
Figure 3:
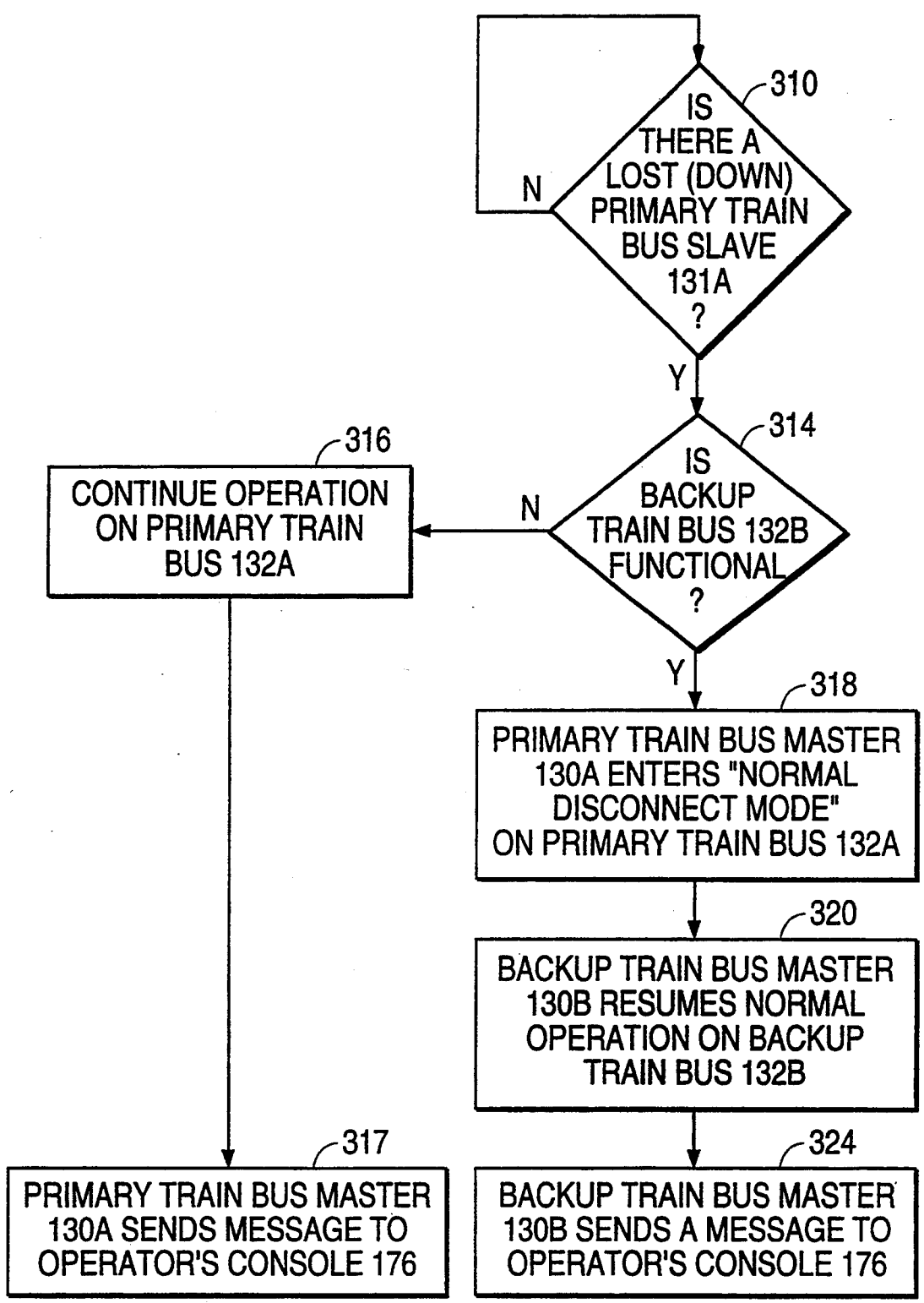
FIG. 3 shows a flow chart of the steps involved in switching over communications from the primary train bus to the back-up train bus upon detection of a failure on the primary train bus.

An embodiment of the invention comprises a method for monitoring back-up train bus 132B (FIG. 2) and for switching over from primary train bus 132A to the back-up train bus 132B upon detection of a failure in primary train bus 132A (FIG. 3).

FIG. 2 is a flow-chart showing the steps involved in monitoring back-up train bus 132B in order to verify its reliability. In step 210, backup train bus master 130B sends an HDLC Command/Response TEST Packet to each one of backup train bus slaves 131B via back-up train bus 132B. Back-up train bus master 130B knows the addresses of all back-up train bus slaves 131B on back-up train bus 132B because back-up train bus 132B was christened according to a christening process disclosed in concurrently filed and commonly owned U.S. patent application Ser. No. 07/853,796, entitled "A Method and Apparatus For Christening a Trainline Monitor System." The HDLC TEST packet contains the address on back-up train bus 132B of back-up train bus master 130B and possibly other data as well (see ISO 4335, section 7.3.1.13). Step 210 is repeated every normal mode cycle (a normal mode cycle is typically a few milliseconds to a few hundred milliseconds). At step 214, back-up train bus slave 131B, upon receiving the HDLC TEST command packet on the back-up train bus 132B, responds to it by sending a TEST response packet containing its address on back-up train bus 132B. However, if that particular back-up train bus slave 131B does not respond to the HDLC TEST packet within a predefined period of time (typically several milliseconds) or if it responds to the HDLC command TEST packet incorrectly, for example, the HDLC response does not contain the correct slave address, then back-up train bus master 130B concludes that back-up train bus slave 131B is not connected to back-up train bus master 130B via back-up train bus 132B. Other examples of incorrect responses to TEST packet include a response packet with an invalid cyclic-redundancy check or incorrect HDLC command byte or incorrect data field.

In step 218, back-up train bus master 130B determines whether it received a TEST packet from back-up train bus slave 131B. If so, steps 210 and 214 are repeated in the subsequent normal mode communication cycle. If not, back-up train bus master 130B determines that back-up train bus 132B has a bus failure at step 220. Consequently, the reliability of back-up train bus 132B is constantly monitored.

FIG. 3 shows a flow-chart of the steps involved in switching over communications from primary train bus 132A to back-up train bus 132B upon detection of a failure on primary train bus 132A. Step 310 involves checking primary train bus 132A to determine whether there has been a lost primary train bus slave 131A. Primary train bus master 130A sends an HDLC TEST packet to primary train bus slaves 131A via primary train bus 132A in a manner analogous to that discussed regarding back-up train bus 132B in FIG. 2. Namely, when a particular primary train bus slave 131A is lost, primary train bus master 130A does not receive an HDLC response packet from that particular primary train bus slave 131A via primary train bus 132A. Step 310 is repeated every normal mode communication cycle until primary train bus master 130A determines that there is a lost primary train bus slave 131A at which point primary train bus master 130A checks back-up train bus master 130B in step 314. If back-up train bus 132B has faults (i.e., is not functional) then primary train bus master 130A continues operation on primary train bus 132A at step 316 and sends a message to operator's console 176 at step 317 indicating that primary and back-up train buses 132A and 132B are down (or have faults) and also indicating which primary train bus slaves 131A are down or lost. If back-up train bus 132B has no faults (i.e., is functional), primary train bus master 130A voids use of primary train bus 132A and enters "Normal Disconnect Mode" on primary train bus 132A i.e., primary train bus master 130A and primary train bus slaves 131A are disconnected from primary train bus 132A as shown in step 318. Then back-up train bus master 130B resumes normal operation on back-up train bus 132B at step 320. At step 324 back-up train bus master 130B sends a message to operator's console 176 indicating that primary train bus 132A is down.

Summarizing, back-up train bus master 130B in TLM system 120 monitors its back-up train bus 132B by performing steps 210–220 of FIG. 2. Operation of TLM system 120 then switches over in accordance with steps 310–324 of FIG. 3 from primary train bus 132A to back-up train bus 132B upon detection of a failed node such as a failed primary train bus slave 131A, provided there are no failed nodes such as a failed back-up train bus slave 131B on back-up train bus 132B.

The invention has been described in detail with respect to preferred embodiments, and it will now be apparent from the foregoing to those skilled in the art that changes and modifications may be made without departing from the invention and its broader aspects, and it is the intention, therefore, in the appended claims to cover all such changes and modifications as fall within the true spirit of the invention.

What is claimed is:

1. A method for monitoring and switching over from a primary train bus to a back-up train bus in a serial communications network having a master node and at least one slave node, the primary train bus and the back-up train bus each serially interconnecting the master node and the at least one slave node, the master node and the at least one slave node having respective addresses on the primary train bus and the backup train bus, addresses of slave nodes on the primary train bus and the backup train bus being accessible to the master node, the method comprising the steps of:
    communicating over the primary train bus;
    indicating during communication over the primary train bus an occurrence of a failure on the primary train bus;
    periodically sending on the back-up train bus from the master node to each of the slave nodes, a master test packet containing the address of the master node on the back-up train bus;
    sending on the back-up train bus from the at least one slave node to the master node and in response to receiving the master test packet, a slave test packet containing the address of the at least one slave node on the back-up train bus;
    indicating an occurrence of a failure of communication on the back-up train bus between the master node and the at least one slave node when no slave test packet is received by the master node via the back-up train bus, or when the slave test packet received via the back-up train bus contains an incorrect address of the at least one slave node on the back-up train bus, otherwise indicating occurrence of no failures on the back-up train bus; and
    disconnecting the primary train bus from the master node and the at least one slave node and thereafter communicating between the master node and the at least one slave node via the back-up train bus when said indicating steps determine an occurrence of a failure on the primary train bus and no failures on the back-up train bus.

2. The method as claimed in claim 1, wherein the serial communications network operates with bus cycles, and wherein said step of periodically sending on the back-up train bus comprises sending during every bus cycle on the back-up train bus, from the master node to each of the slave nodes, a master test packet containing an address of the master node on the back-up train bus.

3. An apparatus for monitoring and switching over from a primary train bus to a back-up train bus in a serial network having a master node and at least one slave node, the primary train bus and the back-up train bus each serially interconnecting the master node and the at least one slave node, the master node and the at least one slave node having respective addresses on the primary train bus and the backup train bus, addresses of slave nodes on the primary and the backup train bus being accessible to the master node, comprising:
    first failure indicating means for indicating during communication on the primary train bus an occurrence of a failure on the primary train bus;
    periodic sending means for periodically sending on the back-up train bus from the master node to each of the slave nodes, a master test packet containing the address of the master node on the back-up train bus;
    sending means for sending on the back-up train bus from the at least one slave node to the master node and in response to receiving the master test packet, a slave test packet containing the address of the at least one slave node on the back-up train bus;
    second failure indicating means for indicating an occurrence of a failure on the back-up train bus between the master node and the at least one slave node if no slave test packet was received by the master node via the back-up train bus, or if the slave test packet received via the back-up train bus contains an incorrect address of the at least one slave node on the back-up train bus, else indicating occurrence of no failures on the back-up train bus; and means for disconnecting the primary train bus from the master node and the at least one slave node and thereafter communicating between the master node and the at least one slave node via the back-up train bus when said first and second indicating means indicate an occurrence of a failure on the primary train bus and no failures on the back-up train bus.

4. The apparatus as claimed in claim 3, wherein the serial communications network operates with bus cycles, and wherein said periodic sending means comprises means for sending during every bus cycle on the back-up train bus, from the master node to each of the slave nodes, a master test packet containing an address of the master node on the back-up train bus.

* * * * *